July 10, 1956
I. H. BOWLES
2,753,872
TOBACCO PROCESSING APPARATUS
Filed March 19, 1953
3 Sheets-Sheet 1
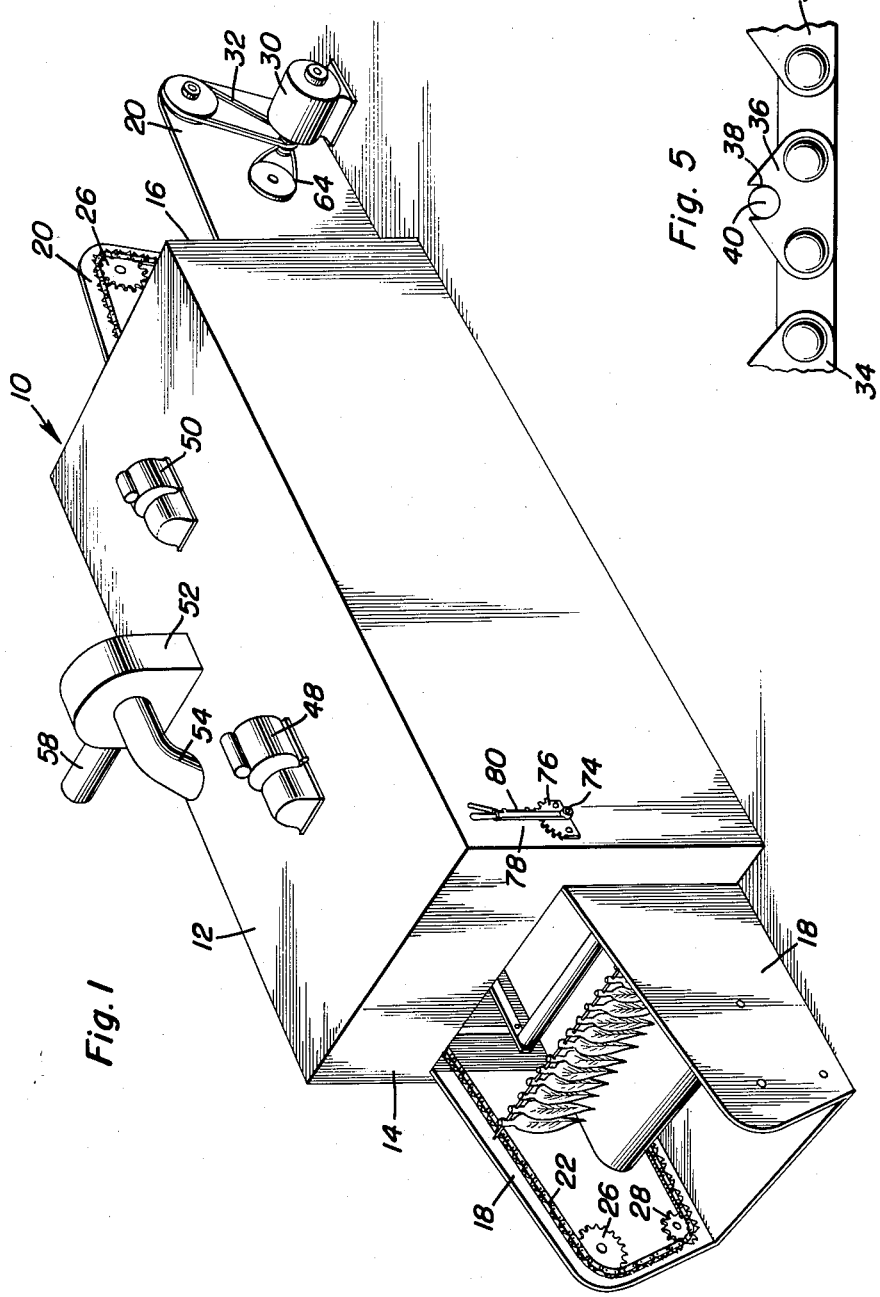
Irvin H. Bowles
INVENTOR.
BY
*Attorneys*

July 10, 1956
I. H. BOWLES
2,753,872
TOBACCO PROCESSING APPARATUS
Filed March 19, 1953
3 Sheets-Sheet 2
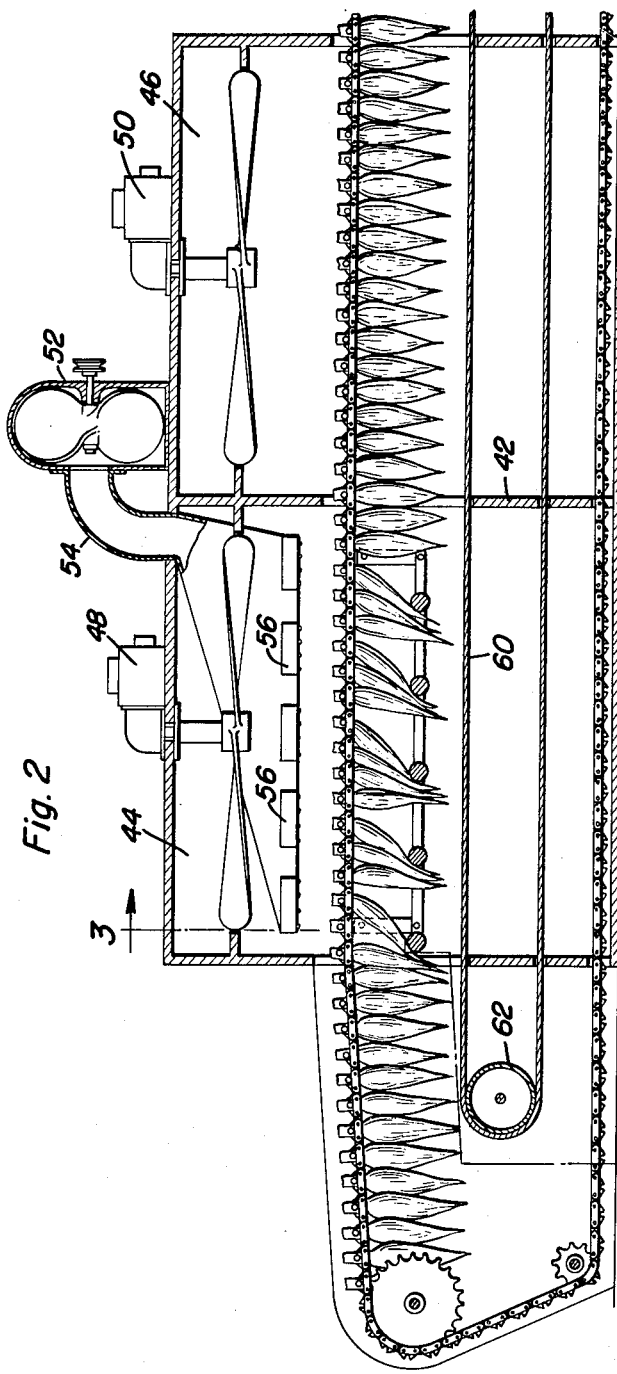
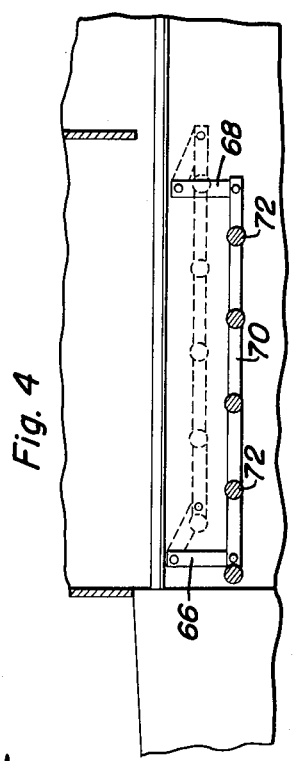
Irvin H. Bowles
INVENTOR.
BY

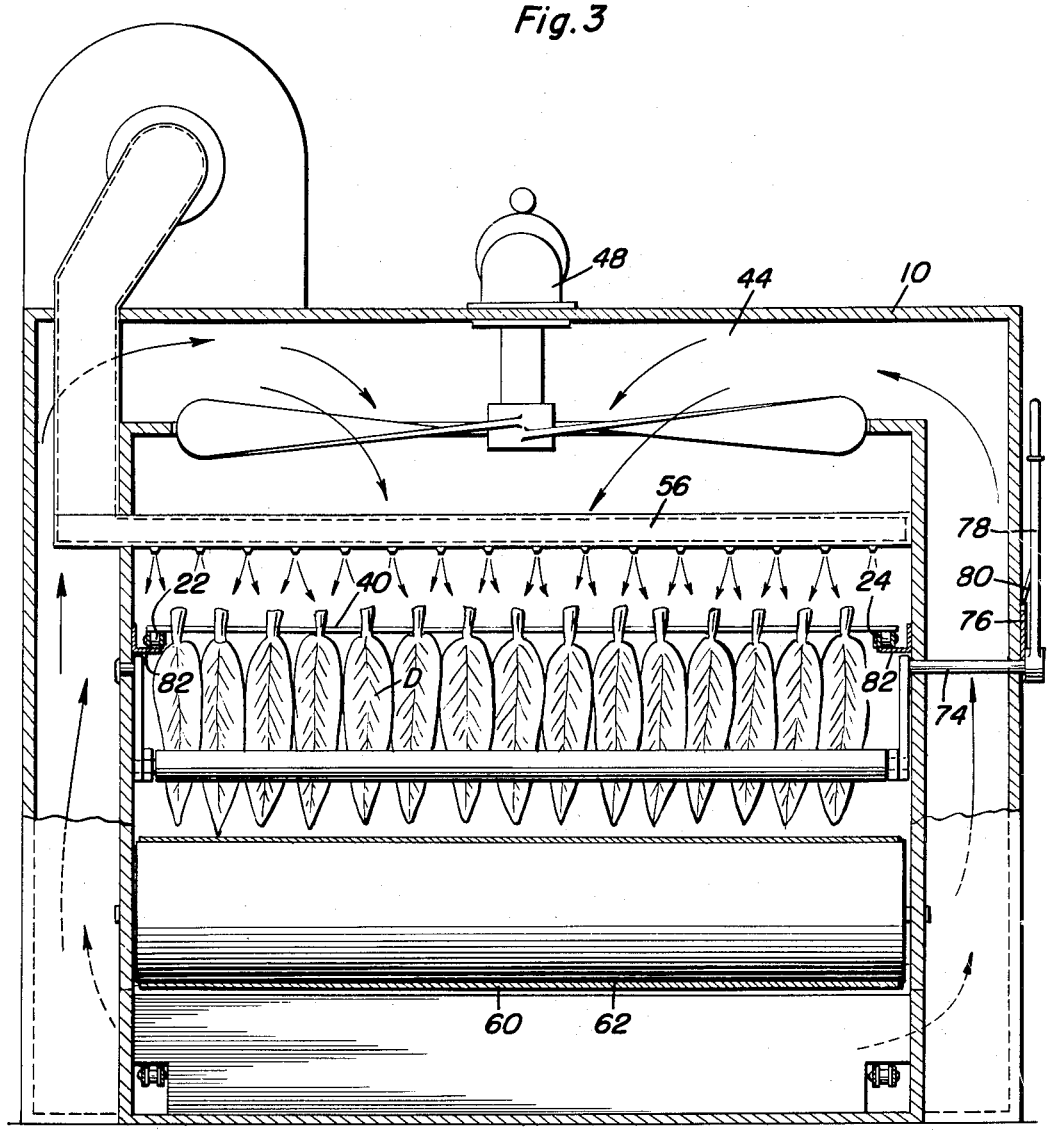

United States Patent Office 2,753,872
Patented July 10, 1956

2,753,872

TOBACCO PROCESSING APPARATUS

Irvin H. Bowles, Greenville, N. C.

Application March 19, 1953, Serial No. 343,435

2 Claims. (Cl. 131—134)

This invention relates to new and useful improvements in tobacco processing apparatus and the primary object of the present invention is to provide a tobacco processing apparatus including plant conveying means movable under overhead air blasts that will agitate, clean and dry the plants conducted thereunder.

Another important object of the present invention is to provide a tobacco processing apparatus including vertically adjustable horizontal spreader bars disposed in close proximity to the conveyor means to effectively spread tobacco plants as they are conducted under the air blasts so that foreign matter clinging to the plants will be discharged therefrom.

A further object of the present invention is to provide a tobacco processing apparatus of the aforementioned character involving a series of horizontally spaced hot air spray tubes which are staggered with respect to the spreader bars to increase the effectiveness of the spray tubes in both drying and cleaning the plants.

A still further aim of the present invention is to provide a tobacco processing apparatus that is simple and practical in construction, strong and reliable in use, efficient and durable in operation, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, in which:

Figure 1 is a perspective view of the present invention;

Figure 2 is a longitudinal vertical sectional view taken through the center of Figure 1;

Figure 3 is an enlarged transverse vertical sectional view taken substantially on the plane of section line 3—3 of Figure 2;

Figure 4 is an enlarged fragmentary view of Figure 2 and showing the spreader unit raised in dotted lines; and, Figure 5 is an enlarged fragmentary side elevational view of one of the conveyor chains used in the present invention.

Referring now to the drawings in detail, wherein for the purpose of illustration, there is disclosed a preferred embodiment of the present invention, the numeral 10 represents a frame including an elongated housing 12 having forward and rear open ends 14 and 16. A pair of spaced parallel connected forward extensions 18 project forwardly from the forward end of housing 12 and a rear pair of spaced parallel connected extensions 20 project rearwardly from the rear end of the housing 12.

A pair of spaced parallel endless conveyor chains 22 and 24 extend longitudinally through the housing 12 and past the ends 14 and 16. These conveyor chains 22 and 24 are engaged with upper and lower sprockets 18 on the extensions 20 to drive the conveyor chains with their upper flights moving from front to rear.

Each of the conveyor chains 22 and 24 is composed of a plurality of links 34 and 36, the latter being disposed between adjacent links 34. Links 36 extend upwardly beyond the links 34 and are formed with seats or recesses 38 in their upper portions for accommodating the ends of tobacco holding sticks 40.

Housing 12 is provided with a transverse vertical portion 42 intermediate the ends of the housing 12 that divides the housing into two compartments 44 and 46. The upper wall of the housing 12 supports fan units 48 and 50 having their impellers located horizontally in the upper portions of the compartments 44 and 46 for directing air downwardly past the conveyor chains 22 and 24.

An impeller or air fan 52 is supported on the upper wall of housing 12 and its outlet 54 extends downwardly through an opening in the upper wall of the housing 12 and is coupled to a plurality of horizontally disposed downwardly facing spray heads or tubes 56 for directing air downwardly past the conveyor chains. The tubes 56 are disposed within the upper portion of compartment 44 and extend transversely between the chains 22 and 24. The inlet 58 of impeller 52 extends to a suitable source of heated air, whereby warm, drying air will be ejected from the orifices of the spray tubes 54.

An endless track-collecting conveyor belt 60 extends longitudinally through housing 12 and is located between the upper and lower flights of the conveyor chains 22 and 24. The supporting rollers 62 of the belt 60 are suitably rotatably supported on the extensions 18 and 20 with the rear roller operatively connected to one of the motors 30, as at 64, to be driven thereby. The upper horizontal flight of belt 60 is spaced sufficiently below the upper flight of the chains 22, 24 as to permit tobacco plants P on sticks 40 to clear the belt 60.

Means is provided for spreading the plants P as they are moved under the spray tubes 54 and the fan unit 48 and for effectively agitating the plants so that foreign matter and debris may gravitate therefrom to pass onto the upper flight of belt 60 to be conducted from the housing 12. This means includes forward and rear hanger arms or links 66 and 68 having their upper ends pivoted to the side walls of the housing 12 in compartment 44 under the upper flights of chains 22, 24 and above the upper flight of belt 60. Pitman links 70 extend horizontally between and are terminally pivoted to the lower ends of links 66 and 68.

A plurality of spaced parallel horizontal shaker and spreader bars 72 are terminally fixed to the pitman links 70 and overlie and extend between the chains 22 and 24. The pivot 74 of one of the forward links 66 projects outwardly past the housing 12 and through a gear segment or ratchet 76 secured to the housing 12. The outer end of pivot 74 fixedly supports a lever 78 that is swung to selectively raise or lower the bars 72. A spring pressed leg 80 slidably carried by lever 78 will enter a selected one of the notches in the gear segment 76 to retain the bars 72 raised or lowered in accordance with the length of the tobacco leaves of the plants P.

The bars 72 alternate with the spray tubes 56 so that the plants will be spread as air is blasted downwardly therethrough to more effectively permit foreign matter to be loosened from the plants and a larger surface of the plants to be exposed to hot air leaving the spray tubes 56.

In order to guide the upper flights of the chains 22 and 24 and prevent the same from sagging under their own weight as well as the plants supported thereby, horizontal guide angles 82 are fixed within the housing 12 and slidably support the upper flight of the chains 22 and 24.

In practical use of the present invention, plants P previously applied to sticks 40 are supported between the upper flights of chains 22 and 24 with the ends of the sticks seated in recesses 38. As the plants engage the bars 72 the plants will be spread, as shown in Figure 2, so that the air directed downwardly by fan unit 48 and spray tubes 56 will effectively clean and dry the plants. Additional air is directed against the plants as they enter the compartment 46 by fan unit 50 to further remove foreign matter attempting to cling to the plants. When the plants leave the housing 12, the sticks are removed from the chains 22, 24.

Bundles of tobacco comprise a plurality of leaves tied together by tobacco leaves. The leaves are sometimes wet and stick together by gum on the leaves making it quite difficult to shake the bundles manually without appreciable breakage. In order to dry the leaves the bundles must be effectively shaken to separate the leaves and permit air to be blasted between adjacent leaves.

This invention obviates the theretofore practice of requiring laborers to separate the leaves by providing spaced rollers that shake, loosen and separate the leaves of bundles. Warm air is directed downwardly through the leaves causing the leaves to loosen and open up and such a feature coacting with the shaker rollers increases the effective shaking, loosening and drying action, it being understood that adjacent bundle holding sticks are spaced apart sufficiently to permit the leaves of a bundle to spread or expand for the purpose of permitting foreign substances to pass from the leaves.

It is to be understood, however, that even though there is herein shown and described a preferred embodiment of the invention, the same is susceptible to certain changes fully comprehended by the spirit of the invention as herein described and the scope of the appended claims.

Having described my invention, what is claimed as new is:

1. A tobacco processing apparatus comprising a frame, a conveyor consisting of side-by-side endless power driven members supported on the frame, overhead fan units supported over the conveyors for directing air downwardly through tobacco plants conveyed by the conveyor, and stop means supported by the frame under one of said fans for spreading tobacco plants as they approach said one fan, and downwardly facing hot air spray heads overlying the conveyor for directing air blasts through tobacco plants being moved by the conveyors, said spray heads being staggered relative to said stop means.

2. A tobacco processing apparatus comprising a frame, an elongated housing forming part of said frame and having front and rear openings, a pair of endless members carried by the frame and having upper flights extending horizontally through the housing between said front and rear openings and supporting tobacco plant holding sticks, overhead fan units supported in the housing over said upper flights for directing air downwardly through plants carried by said upper flights, an imperforate trash collecting endless conveyor supported by the frame under the upper flights of said pair of members, and a series of vertically adjustable horizontal spreader bars supported in the housing under the upper flights of said pair of members for spreading plants being conducted by said pair of members, and a series of horizontally spaced air blast tubes over the upper flights of said pair of members and staggered with respect to said bars.

References Cited in the file of this patent

UNITED STATES PATENTS

| | | |
|---|---|---|
| 460,002 | Dula | Sept. 22, 1891 |
| 588,530 | Proctor | Aug. 17, 1897 |
| 951,650 | Miller | Mar. 8, 1910 |
| 1,017,713 | Vaughan | Feb. 20, 1912 |
| 1,362,893 | Paylor | Dec. 21, 1920 |
| 1,670,262 | Kershaw | May 15, 1928 |
| 2,002,060 | Harris | May 21, 1935 |

FOREIGN PATENTS

| | | |
|---|---|---|
| 375,036 | Great Britain | June 23, 1932 |
| 440,482 | Great Britain | Dec. 27, 1935 |